US012661946B2

(12) United States Patent
Janhar et al.

(10) Patent No.: US 12,661,946 B2
(45) Date of Patent: Jun. 23, 2026

(54) AIR SPRING

(71) Applicant: ContiTech AG, Hannover (DE)

(72) Inventors: Ziga Janhar, Smlednik (SI); Peter Heberle, Kranj (SI); Matej Kosir, Trzic (SI); Brane Stojko, Sencur (SI); Francesc Bosch-Masgrau, Wunstorf (DE); Carsten Hansen, Peine (DE); Simon Oman, Ljubljana (SI)

(73) Assignee: ContiTech AG, Hannover (DE)

( * ) Notice: Subject to any disclaimer, the term of this patent is extended or adjusted under 35 U.S.C. 154(b) by 336 days.

(21) Appl. No.: 18/255,836

(22) PCT Filed: Nov. 9, 2021

(86) PCT No.: PCT/EP2021/081077
§ 371 (c)(1),
(2) Date: Jun. 2, 2023

(87) PCT Pub. No.: WO2022/117293
PCT Pub. Date: Jun. 9, 2022

(65) Prior Publication Data
US 2024/0010038 A1        Jan. 11, 2024

(30) Foreign Application Priority Data
Dec. 2, 2020    (EP) ..................................... 20211318

(51) Int. Cl.
    *B60G 11/27*          (2006.01)
    *B60G 11/28*          (2006.01)
(52) U.S. Cl.
    CPC .............. *B60G 11/27* (2013.01); *B60G 11/28* (2013.01); *B60G 2202/152* (2013.01); *B60G 2204/126* (2013.01); *B60G 2206/424* (2013.01)

(58) Field of Classification Search
    CPC .. B60G 11/27; B60G 11/28; B60G 2202/152; B60G 2204/126; B60G 2206/424
    (Continued)

(56) References Cited

U.S. PATENT DOCUMENTS 1,141,360 A      6/1915  Rudd
3,826,507 A  *   7/1974  Brand ........................ B61F 5/10
                                                      267/3

(Continued)

FOREIGN PATENT DOCUMENTS

EP        0295393 A2    12/1989
EP        3499081 A1     5/2018
EP        3447329 A1     2/2019

OTHER PUBLICATIONS

International search report dated Feb. 1, 2022 of PCT/EP2021/081077 on which this application is based.

(Continued)

*Primary Examiner* — Christopher P Schwartz
(74) *Attorney, Agent, or Firm* — Lippes Mathias LLP

(57) ABSTRACT

An air spring with an air spring rolling bellows made of elastomer material with reinforcing layers embedded within the rolling bellows wall, the air spring being clamped in between a sprung and an unsprung mass, and the air spring rolling bellows, at least at one of its two open ends, having a bead ring or a reinforced end region and being fastened in an airtight manner to an air spring cover connected to the sprung mass, the rolling bellows being fastened in an airtight manner by way of its other open end to a connection part connected to the unsprung mass, and the cover, connection part and rolling bellows delimiting a working space filled with compressed air, wherein at least the airtight connection between the air spring rolling bellows and the air spring cover is effected by means of a connecting element which is (Continued)

Figure 1:
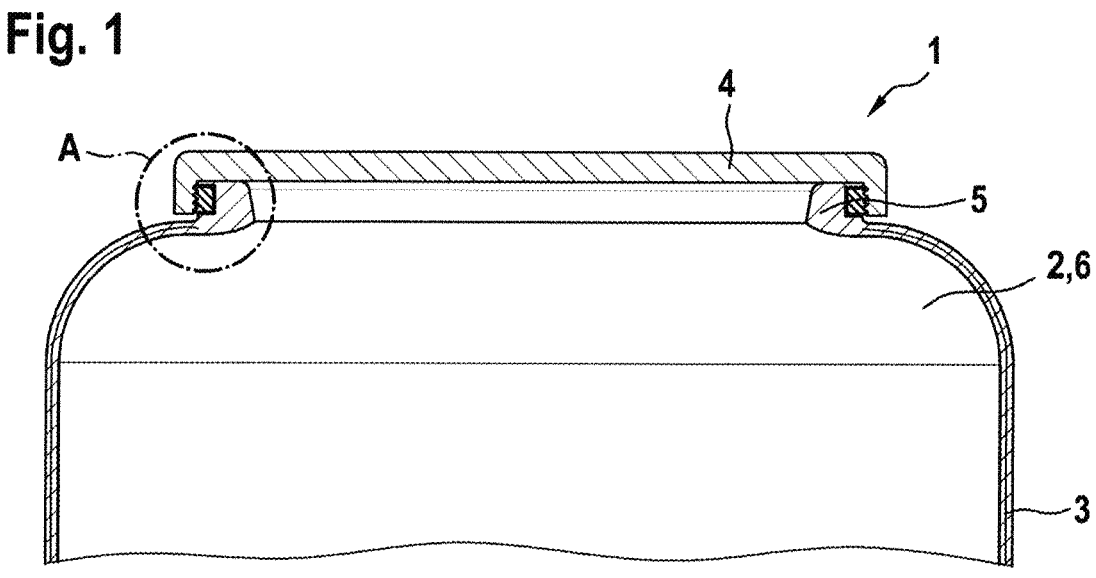

fastened to the bead ring or to the reinforced end region in a materially bonded and/or positively locking manner.

5 Claims, 3 Drawing Sheets

(58) Field of Classification Search
USPC .......................................... 267/64.24, 64.27
See application file for complete search history.

(56)                    References Cited

U.S. PATENT DOCUMENTS

| | | | |
|---|---|---|---|
| 4,784,376 A | | 11/1988 | Ecktman |
| 4,787,607 A | * | 11/1988 | Geno ........................ F16J 3/042 |
| | | | 267/64.11 |
| 5,954,316 A | * | 9/1999 | Voss ........................ B60G 11/27 |
| | | | 267/64.27 |
| 6,386,524 B1 | | 5/2002 | Levy et al. |
| 6,619,635 B1 | * | 9/2003 | Hilburger .............. F16F 9/0463 |
| | | | 267/64.23 |
| 7,681,868 B2 | | 3/2010 | Scholz |
| 9,388,876 B2 | | 7/2016 | Trowbridge et al. |
| 2013/0270753 A1 | * | 10/2013 | Balachonzew ....... F16F 9/0454 |
| | | | 267/64.27 |

OTHER PUBLICATIONS

EP Search Report dated May 17, 2021 of European application 20211318.9 which claims priority the same application.

* cited by examiner

AIR SPRING

The invention relates to an air spring with an air spring rolling bellows made of elastomer material with reinforcing layers embedded within the rolling bellows wall, the air spring being clamped in between a sprung and an unsprung mass, and the air spring rolling bellows, at least at one of its two open ends, having a bead ring or a reinforced end region and being fastened in an airtight manner to an air spring cover connected to the sprung mass, the rolling bellows being fastened in an airtight manner by way of its other open end to a connection part connected to the unsprung mass, and the cover, connection part and rolling bellows delimiting a working space filled with compressed air.

PRIOR ART

The use of air springs in vehicles is nowadays customary for reasons of the ride comfort and the adjustable large travel stroke and is in particular the norm in the case of buses and heavy goods vehicles. Acceptance has finally been gained here of rolling bellows/tubular rolling bellows which have multilayer and possibly reinforced walls made of elastomer materials and which are fixedly connected or clamped at their ends to connection parts made of metal or plastic. These are customarily, on the one hand, an air spring cover and, on the other hand, an air spring piston on which the air spring bellows can roll in operation, that is to say during compression and extension, with the formation of a rolling fold.

The air spring cover is as a rule connected to the vehicle body, that is to say the sprung mass, whereas the air spring piston is fastened to the chassis, that is to say to the so-called unsprung mass. The air springs are connected to an air supply, customarily by means of hoses and/or air lines which, via corresponding connections and valves for air delivery and control on the air spring cover, are connected to the working space or pressure space within the air spring bellows. The air is supplied by way of a pressure accumulator located in the vehicle, which is filled by means of a compressor and then provides the supply of air for the individual sprung systems by way of a controller. The air-spring controller is often incorporated in the rest of the vehicle control system.

The connection parts and the air spring bellows thus enclose the working space which is under internal pressure and contains the air spring volume and which is connected to the air connection which is as a rule provided in the cover.

U.S. Pat. No. 6,386,524 B1 discloses an air spring in which the customarily present construction of the connection between the air spring bellows and the connection parts becomes clear. Whereas the connection to the air spring cover occurs by crimping or flanging a bead ring formed at the upper end of the air spring bellows and having an inserted core wire (COM, crimped on metal), the connection to the rolling piston, which is here formed from plastic, is provided such that the lower end of the air spring bellows, said lower end being provided with a further bead ring, is pushed or pressed merely with a fit onto a seat, which is complementary thereto, of the piston.

The connection shown there between the air spring bellows and the piston disadvantageously requires complicated precisely tailored machining of the sealing surfaces and of the connection cross section on the piston and, on the other hand, is not secure during lifting of the vehicle since the piston can be pulled off the air spring bellows.

Problem Addressed by the Invention

The problem addressed by the present invention was accordingly to provide an air spring with a very reliable and robust airtight connection between the air spring rolling bellows and the connection parts, the connection both preventing undesired pulling off of the air spring from the connection part, as can happen for instance during lifting of the vehicle, and being simple to produce and usable in various embodiments.

Solution to the Problem

This problem is solved by the features of the main claim. Further advantageous embodiments are disclosed in the dependent claims.

In this case, at least the airtight connection between the air spring rolling bellows and the air spring cover is effected by means of a connecting element, or connecting ring, which is fastened to the bead ring or to the reinforced end region in a materially bonded and/or positively locking manner. With such an embodiment, there is no need during the assembly of air spring rolling bellows and connection part/air spring cover for the relatively laborious flanging, which is typically required, of the air spring cover around a bead of the air spring. The connecting element can be prefabricated and configured such that, on the one hand, simple assembly and, on the other hand, reliable fastening can be effected.

In addition, not only is there a reduction in the complexity with regard to variety of parts and assembly, which is often present in the case of the hitherto customary connections, but there is also the possibility of using materials which have hitherto not been used in the prior art for the individual connecting parts, for instance in the form of connecting parts made of plastic, plastic composite materials or fiber materials.

One advantageous development consists in that the connecting element is configured in the form of a screw ring which is provided with an external thread and which can be screwed into a complementary internal thread provided in the air spring cover. The screw ring can in this case be composed of different materials, which of course need to be compatible with the connected materials. In this case, provision is advantageously made for the screw ring to be composed of plastic or plastics resin and to be adhesively bonded to, or vulcanized with, the bead ring. In this way, the connection or a part of the connection is prefabricated already during the manufacture of the air spring bellows and can be connected in a very simple manner to the connection part during the assembly, without special tools, for example for the flanging, needing to be made available.

A further advantageous embodiment consists in that the bead ring is configured such that, during the screwing operation, parts of the bead ring or of the air spring bellows bear against the air spring cover and are deformed in a sealing manner. In this case, a screw ring, for example, is inserted into the bead ring such that said screw ring is surrounded on three sides, specifically on the surfaces without threads, by the material of the bead ring, that is to say by the material of the air spring rolling bellows. During the screwing-in operation, pressure is then applied to this flexible material at boundary surfaces with respect to the cover and said material thus constitutes an exceptionally reliable seal.

An equally effective further advantageous embodiment consists in that the air spring cover has a sealing surface and an associated sealing element, for example an insertable sealing ring or a seal in the threaded region, said sealing element being activated by the screwing-in operation.

A further advantageous embodiment consists in that the connecting element is configured in the form of a part of a snap-fit or latching connection which interacts with the air spring cover. In such connections, for example by means of a snap-fit ring which has been vulcanized onto the bead ring, the assembly is even more simple than in the case of screw connections and can be designed and constructed in a variety of ways. The connecting element, if it has been prefabricated in the form of a ring-shaped element, can also be connected to the bead ring/rolling bellows bead or to the air spring cover in a simple manner, for example by means of friction welding.

A further advantageous embodiment consists in that the connecting element is composed of plastic or plastics resin and is adhesively bonded to, or vulcanized on, the outer circumference of the bead ring. A whole range of adhesives or resins which are adapted to the materials to be connected are conceivable here.

A further advantageous embodiment consists in that the connecting element is connected to the air spring bellows already during the vulcanization thereof.

EXEMPLARY EMBODIMENT/DETAILED DESCRIPTION OF THE INVENTION

Figure 2:
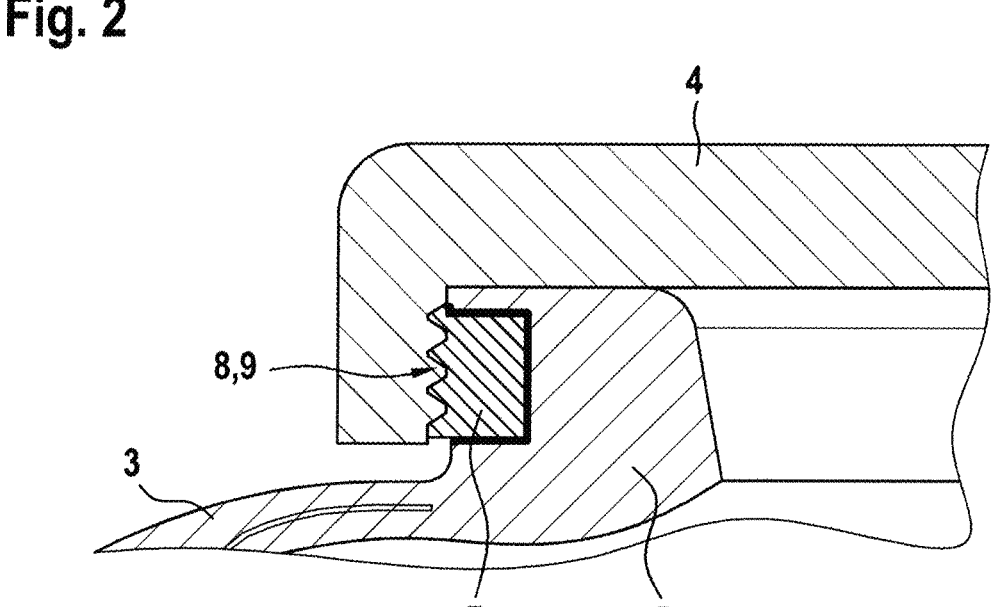
Figure 3:
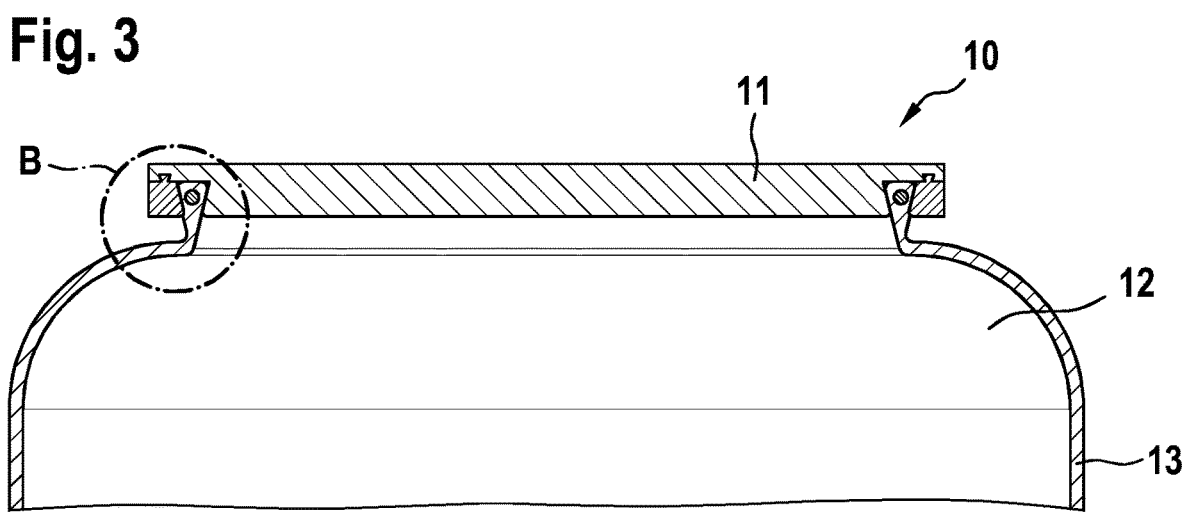
Figure 4:
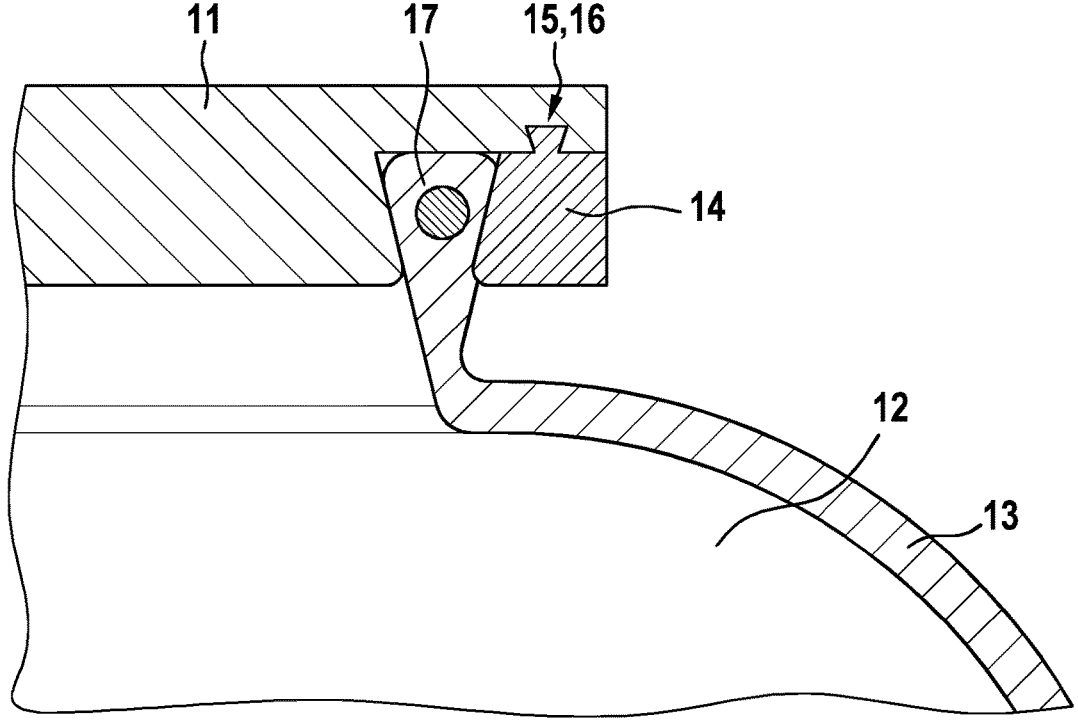
Figure 5:
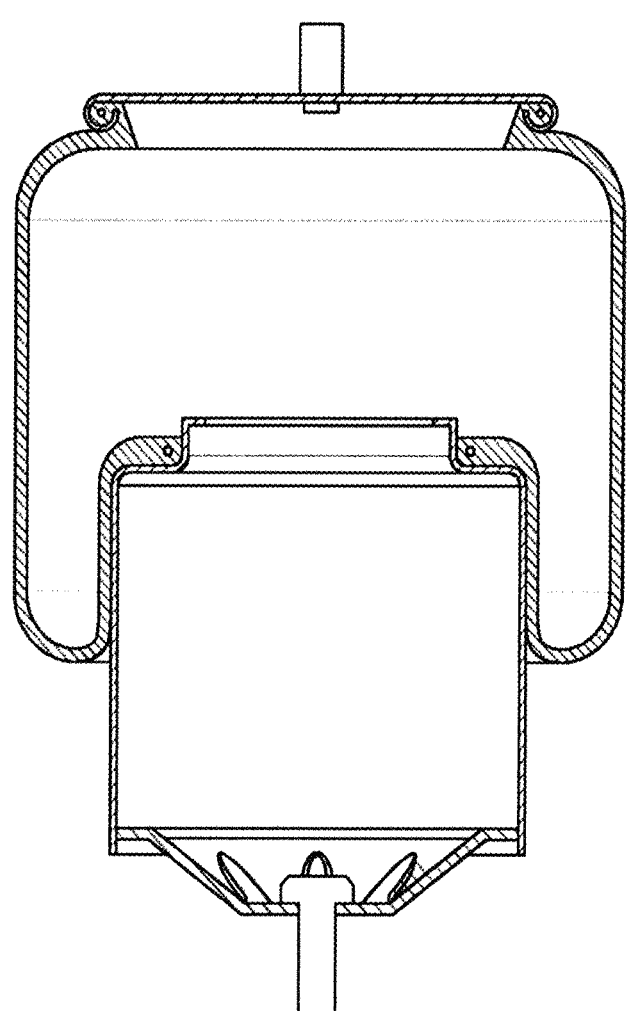

The invention will be explained in more detail on the basis of an exemplary embodiment. In the figures:

FIG. 1 shows the upper part of an air spring according to the invention in cross section, FIG. 2 shows a detail A from FIG. 1 in enlarged form, FIG. 3 shows a further embodiment of the air spring according to the invention, FIG. 4 shows a detail B from FIG. 2 in enlarged form, FIG. 5 shows a connection between the air spring bellows and the air spring cover from the prior art.

FIG. 1 shows the upper part of an air spring 1 in cross section with an air spring rolling bellows 2 made of elastomer material. Reinforcing layers, not illustrated in any more detail here, are embedded within the rolling bellows wall 3. The air spring is clamped in between a sprung and an unsprung mass, specifically is connected to the vehicle body via the air spring cover 4 and is connected, at the lower end of said air spring which is not illustrated here, to the chassis via an air spring piston. Such a fundamental embodiment and clamping is also shown by the illustration of an air spring from the prior art, as is shown in FIG. 5.

The air spring rolling bellows 2 has, at its upper end, a bead ring 5, as can best be seen in FIG. 2 which illustrates the detail A shown in FIG. 1 in enlarged form. The bead ring 5 is used for the airtight fastening of the air spring rolling bellows to the air spring cover 4, such that the air spring cover, air spring piston and rolling bellows delimit a working space 6 filled with compressed air.

The airtight connection between the air spring rolling bellows 2 and the air spring cover 4 is effected in this case by means of a connecting element which is fastened to the bead ring in a materially bonded and positively locking manner, specifically here by means of a screw ring 7 which is provided with an external thread 8 and which can be screwed into a complementary internal thread 9 provided in the air spring cover 4. Here, the screw ring is composed of plastic and is adhesively bonded to the bead ring at the surfaces where it contacts said bead ring. The bead ring 5 is configured in the form of an end-side thickening of the rolling bellows wall 3. The bead ring 5 is in this case configured such that, during the screwing operation, the axially upper horizontal surface of the bead ring bears against the air spring cover 4 and is deformed in a sealing manner.

FIGS. 3 and 4 show a further embodiment of the air spring according to the invention, in which the connecting element is configured in the form of a part of a snap-fit or latching connection which interacts with the air spring cover. Similarly to FIG. 1, FIG. 3 here shows the upper part of an air spring 10 with an air spring cover 11 and an air spring rolling bellows 12 made of elastomer material in cross section, and FIG. 4 shows the enlarged detail B marked in FIG. 3.

The airtight connection between the air spring rolling bellows 12 and the air spring cover 11 is effected here by means of a connecting element which is connected to a bead ring 17 in a materially bonded and positively locking manner and which is configured in the form of a snap-fit ring 14. Here, the bead ring 17 is also configured in the form of an end-side thickening of the rolling bellows wall 13 but is additionally provided with a core. The snap-fit ring 14 is provided with a spring 15 which can be latched into a groove 16 provided in the air spring cover 11. Here, the snap-fit ring 14 is composed of plastic and is likewise adhesively bonded to the bead ring at the surfaces where it contacts said bead ring.

For comparison purposes, FIG. 5 shows a conventional connection between an air spring bellows and an air spring cover from the prior art, in which a bead ring provided on the end side of the air spring bellows is flanged with the outer regions of the metallic cover.

LIST OF REFERENCE DESIGNATIONS

Part of the Description

1 Air spring
2 Air spring rolling bellows
3 Rolling bellows wall
4 Air spring cover
5 Bead ring
6 Working space
7 Screw ring
8 External thread on the screw ring
9 Internal thread on the air spring cover
10 Air spring
11 Air spring cover
12 Air spring rolling bellows
13 Rolling bellows wall
14 Snap-fit ring
15 Spring on the snap-fit ring
16 Groove in the air spring cover 11
17 Bead ring

The invention claimed is:
1. An air spring comprising:
a plurality of air spring rolling bellows made of elastomer material with reinforcing layers embedded within the rolling bellows wall;
the air spring clamped in between a sprung and an unsprung mass;
the air spring rolling bellows comprising two open ends, at least at one of its two open ends, having a bead ring and fastened in an airtight manner to an air spring cover connected to the sprung mass;

the rolling bellows fastened in an airtight manner by way of its other open end to a connection part connected to the unsprung mass;

the air spring cover, connection part and rolling bellows delimiting a working space filled with compressed air, wherein at least the airtight connection between the air spring rolling bellows and the air spring cover is effected by means of a connecting element which is fastened to the bead ring in a materially bonded and/or positively locking manner, wherein the connecting element is configured in the form of a screw ring inserted into the bead ring, the screw ring is provided with an external thread and can be screwed into a complementary internal thread provided in the air spring cover.

2. The air spring of claim 1, in which the screw ring (7) is composed of plastic or plastics resin and is adhesively bonded to, or vulcanized with, the bead ring.

3. The air spring of claim 1, in which the bead ring (5, 17) is configured such that, during the screwing operation, parts of the bead ring or of the air spring bellows bear against the air spring cover (4, 11) and are deformed in a sealing manner.

4. The air spring of claim 1, in which the air spring cover has a sealing surface and an associated sealing element which is activated by the screwing-in operation.

5. The air spring of claim 1, in which the connecting element (7, 14) is connected to the air spring bellows during a vulcanization thereof.

* * * * *